(12) United States Patent
Siddiqui et al.

(10) Patent No.: US 7,153,335 B2
(45) Date of Patent: Dec. 26, 2006

(54) TUNABLE COMPOSITION AND METHOD FOR CHEMICAL-MECHANICAL PLANARIZATION WITH ASPARTIC ACID/TOLYLTRIAZOLE

(75) Inventors: Junaid Ahmed Siddiqui, Richmond, VA (US); Timothy Frederick Compton, Casa Grande, AZ (US); Bin Hu, Chandler, AZ (US); Robin Edward Richards, Phoenix, AZ (US)

(73) Assignee: Dupont Air Products Nanomaterials LLC, Tempe, AZ (US)

( * ) Notice: Subject to any disclaimer, the term of this patent is extended or adjusted under 35 U.S.C. 154(b) by 0 days.

(21) Appl. No.: 10/683,232

(22) Filed: Oct. 10, 2003

(65) Prior Publication Data

US 2005/0076578 A1   Apr. 14, 2005

(51) Int. Cl.
 C09G 1/02   (2006.01)
 C09G 1/04   (2006.01)
 C09K 13/14  (2006.01)
 B24B 1/00   (2006.01)

(52) U.S. Cl. .............................. 51/307; 51/309; 106/3; 106/11; 438/692; 438/693; 252/79.1; 252/79.4

(58) Field of Classification Search .......... 51/307–309; 106/3, 11; 438/692, 693; 216/89, 96; 252/79.1, 252/79.4
See application file for complete search history.

(56) References Cited

U.S. PATENT DOCUMENTS

| | | | | |
|---|---|---|---|---|
| 5,275,749 A | * | 1/1994 | Kugel et al. | 508/375 |
| 6,440,186 B1 | * | 8/2002 | Sakai et al. | 51/308 |
| 6,565,619 B1 | * | 5/2003 | Asano et al. | 51/308 |
| 6,656,241 B1 | * | 12/2003 | Hellring et al. | 51/308 |
| 6,679,929 B1 | * | 1/2004 | Asano et al. | 51/308 |
| 2002/0096659 A1 | * | 7/2002 | Sakai et al. | 252/79 |
| 2002/0132560 A1 | * | 9/2002 | Luo et al. | 451/36 |
| 2003/0013387 A1 | * | 1/2003 | Tsai et al. | 451/41 |
| 2004/0067649 A1 | * | 4/2004 | Hellring et al. | 438/689 |
| 2004/0077295 A1 | * | 4/2004 | Hellring et al. | 451/41 |

OTHER PUBLICATIONS

B.L. Mueller, et al, "Polishing Surfaces for Integrated Circuits," Chemtech, Feb. 1998, pp. 38-46, no month.
H. Landis, et al, "Integration of Chemical-Mechanical Polishing Into CMOS integrated Circuit Manufacturing," Thin Solids Films, 1992, p. 1-7, vol. 220, no month.
Kumar, et al, "Chemical-Mechanical Polishing of Copper in Glycerol Based Slurries," Mat. Res. Soc. Symp. Proc., 1996, vol. 427, no month.
Gutmann, et al, "Chemical-Mechanical Polishing of Copper with Oxide and Polymer Interlevel Dielectrics," Thin Solid Films 270, 1995, p. 596-600, no month.
Luo, et al, "Stabilization of Alumina Slurry for Chemical-Mechanical Polishing of Copper," Languir, 1996, p. 3563-3566, vol. 12, no month.
Carpio, et al, "Initial Study on Copper CMP Slurry Chemistries," Thin Solid Films 266, 1995, p. 238-244, no month.
Z. Stavreva, et al, "Influence of Process Parameters on Chem.-Mech. Polishing of Copper," Micro. Engineering, 1997, p. 143-149, vols. 37-38, no month.
D. Zeidler, et al, "The Interaction Between Different Barrier Metals . . . ," Micro. Engineering, 1997, p. 237-243, vols. 37-38, no month.
Z. Stavreva, et al, "Chem.-Mech. Polishing of Copper for . . . ," Micro. Engineering, 1997, p. 249-257, vol. 33, no month.
D. Zeidler, et al, "Characterization of Cu Chem. Mech. Polishing by . . . , " Micro. Engineering, 1997, p. 259-265, vol. 33, no month.

* cited by examiner

Primary Examiner—Michael A. Marcheschi
(74) Attorney, Agent, or Firm—Geoffrey L. Chase

(57) ABSTRACT

A composition and associated method for chemical mechanical planarization (or other polishing) are described which afford high tantalum to copper selectivity in copper CMP and which are tunable (in relation to polishing performance). The composition comprises an abrasive and an N-acyl-N-hydrocarbonoxyalkyl aspartic acid compound and/or a tolyltriazole derivative.

16 Claims, No Drawings

TUNABLE COMPOSITION AND METHOD FOR CHEMICAL-MECHANICAL PLANARIZATION WITH ASPARTIC ACID/TOLYLTRIAZOLE

BACKGROUND OF THE INVENTION

This invention relates generally to the chemical-mechanical planarization (CMP) of metal substrates on semiconductor wafers and slurry compositions therefor. In particular, the present invention relates to a CMP slurry composition that is stable for long periods with or without hydrogen peroxide even under acidic conditions and which is characterized to possess high selectivity for removal of tantalum in relation to copper during CMP processing of substrates comprised of copper, tantalum and dielectric material. This invention is especially useful for step 2 copper CMP where high tantalum to copper selectivity as well as tuneability is desired.

Chemical mechanical planarization (chemical mechanical polishing, CMP) for planarization of semiconductor substrates is now widely known to those skilled in the art and has been described in numerous patents and open literature publications. Some introductory references on CMP are as follows: "Polishing Surfaces for Integrated Circuits", by B. L. Mueller and J. S. Steckenrider, Chemtech, February, 1998, pages 38–46; and H. Landis et al., Thin Solids Films, 220 (1992), page 1.

In a typical CMP process, a substrate (e.g., a wafer) is placed in contact with a rotating polishing pad attached to a platen. A CMP slurry, typically an abrasive and chemically reactive mixture, is supplied to the pad during CMP processing of the substrate. During the CMP process, the pad (fixed to the platen) and substrate are rotated while a wafer carrier system or polishing head applies pressure (downward force) against the substrate. The slurry accomplishes the planarization (polishing) process by chemically and mechanically interacting with the substrate film being planarized due to the effect of the rotational movement of the pad relative to the substrate. Polishing is continued in this manner until the desired film on the substrate is removed with the usual objective being to effectively planarize the substrate. Typically metal CMP slurries contain an abrasive material, such as silica or alumina, suspended in an oxidizing, aqueous medium.

Silicon based semiconductor devices, such as integrated circuits (ICs), typically include a silicon dioxide dielectric layer. Multilevel circuit traces, typically formed from aluminum or an aluminum alloy or copper, are patterned onto the silicon dioxide substrate.

CMP processing is often employed to remove and planarize excess metal at different stages of semiconductor manufacturing. For example, one way to fabricate a multilevel copper interconnect or planar copper circuit traces on a silicon dioxide substrate is referred to as the damascene process. In a semiconductor manufacturing process typically used to form a multilevel copper interconnect, metallized copper lines or copper vias are formed by electrochemical metal deposition followed by copper CMP processing. In a typical process, the interlevel dielectric (ILD) surface is patterned by a conventional dry etch process to form vias and trenches for vertical and horizontal interconnects and make connection to the sublayer interconnect structures. The patterned ILD surface is coated with an adhesion-promoting layer such as titanium or tantalum and/or a diffusion barrier layer such as titanium nitride or tantalum nitride over the ILD surface and into the etched trenches and vias. The adhesion-promoting layer and/or the diffusion barrier layer is then overcoated with copper, for example, by a seed copper layer and followed by an electrochemically deposited copper layer. Electro-deposition is continued until the structures are filled with the deposited metal. Finally, CMP processing is used to remove the copper overlayer, adhesion-promoting layer, and/or diffusion barrier layer, until a planarized surface with exposed elevated portions of the dielectric (silicon dioxide and/or low-k) surface is obtained. The vias and trenches remain filled with electrically conductive copper forming the circuit interconnects.

When one-step copper CMP processing is desired, it is usually important that the removal rate of the metal and barrier layer material be significantly higher than the removal rate for dielectric material in order to avoid or minimize dishing of metal features or erosion of the dielectric. Alternatively, a multi-step copper CMP process may be employed involving the initial removal and planarization of the copper overburden, referred to as a step 1 copper CMP process, followed by a barrier layer CMP process. The barrier layer CMP process is frequently referred to as a barrier or step 2 copper CMP process. Previously, it was believed that the removal rate of the copper and the adhesion-promoting layer and/or the diffusion barrier layer must both greatly exceed the removal rate of dielectric so that polishing effectively stops when elevated portions of the dielectric are exposed. The ratio of the removal rate of copper to the removal rate of dielectric base is called the "selectivity" for removal of copper in relation to dielectric during CMP processing of substrates comprised of copper, tantalum and dielectric material. The ratio of the removal rate of tantalum to the removal rate of dielectric base is called the "selectivity" for removal of tantalum in relation to dielectric during CMP processing. When CMP slurries with high selectivity for removal of copper and tantalum in relation to dielectric are used, the copper layers are easily over-polished creating a depression or "dishing" effect in the copper vias and trenches. This feature distortion is unacceptable due to lithographic and other constraints in semiconductor manufacturing.

Another feature distortion that is unsuitable for semiconductor manufacturing is called "erosion." Erosion is the topography difference between a field of dielectric and a dense array of copper vias or trenches. In CMP, the materials in the dense array maybe removed or eroded at a faster rate than the surrounding field of dielectric. This causes a topography difference between the field of dielectric and the dense copper array.

A typically used CMP slurry has two actions, a chemical component and a mechanical component. An important consideration in slurry selection is "passive etch rate." The passive etch rate is the rate at which copper is dissolved by the chemical component alone and should be significantly lower than the removal rate when both the chemical component and the mechanical component are involved. A large passive etch rate leads to dishing of the copper trenches and copper vias, and thus, preferably, the passive etch rate is less than 10 nanometers per minute.

A number of systems for CMP of copper have been disclosed. A few illustrative examples are listed next. Kumar et al. in an article entitled "Chemical-Mechanical Polishing of Copper in Glycerol Based Slurries" (*Materials Research Society Symposium Proceedings,* 1996) disclose a slurry that contains glycerol and abrasive alumina particles. An article by Gutmann et al. entitled "Chemical-Mechanical Polishing of Copper with Oxide and Polymer Interlevel Dielectrics" (*Thin Solid Films,* 1995) discloses slurries based on either ammonium hydroxide or nitric acid that may contain benzotriazole (BTA) as an inhibitor of copper dissolution. Luo et al. in an article entitled "Stabilization of Alumina Slurry for Chemical-Mechanical Polishing of Copper" (*Langmuir,* 1996) discloses alumina-ferric nitrate slurries that contain polymeric surfactants and BTA. Carpio et al. in an article entitled "Initial Study on Copper CMP Slurry Chemistries" (*Thin Solid Films,* 1995) disclose slurries that contain either alumina or silicon particles, nitric acid or ammonium hydroxide, with hydrogen peroxide or potassium permanganate as an oxidizer.

In relation to copper CMP, the current state of this technology involves use of a two-step process to achieve local and global planarization in the production of IC chips. During step 1 of a copper CMP process, the overburden copper is removed. Then step 2 of the copper CMP process follows to remove the barrier layer and achieve both local and global planarization. Generally, after removal of overburden copper in step 1, polished wafer surfaces have non-uniform local and global planarity due to differences in the step heights at various locations of the wafer surfaces. Low density features tend to have higher copper step heights whereas high density features tend to have low step heights. Due to differences in the step heights after step 1, step 2 copper CMP selective slurries with respect to tantalum to copper removal rates and copper to oxide removal rates are highly desirable. The ratio of the removal rate of tantalum to the removal rate of copper is called the "selectivity" for removal of tantalum in relation to copper during CMP processing of substrates comprised of copper, tantalum and dielectric material.

There are a number of theories as to the mechanism for chemical-mechanical polishing of copper. An article by Zeidler et al. (*Microelectronic Engineering,* 1997) proposes that the chemical component forms a passivation layer on the copper changing the copper to a copper oxide. The copper oxide has different mechanical properties, such as density and hardness, than metallic copper and passivation changes the polishing rate of the abrasive portion. The above article by Gutmann et al. discloses that the mechanical component abrades elevated portions of copper and the chemical component then dissolves the abraded material. The chemical component also passivates recessed copper areas minimizing dissolution of those portions.

These are two general types of layers that can be polished. The first layer is interlayer dielectrics (ILD), such as silicon oxide and silicon nitride. The second layer is metal layers such as tungsten, copper, aluminum, etc., which are used to connect the active devices.

In the case of CMP of metals, the chemical action is generally considered to take one of two forms. In the first mechanism, the chemicals in the solution react with the metal layer to continuously form an oxide layer on the surface of the metal. This generally requires the addition of an oxidizer to the solution such as hydrogen peroxide, ferric nitrate, etc. Then the mechanical abrasive action of the particles continuously and simultaneously removes this oxide layer. A judicious balance of these two processes obtains optimum results in terms of removal rate and polished surface quality.

In the second mechanism, no protective oxide layer is formed. Instead, the constituents in the solution chemically attack and dissolve the metal, while the mechanical action is largely one of mechanically enhancing the dissolution rate by such processes as continuously exposing more surface area to chemical attack, raising the local temperature (which increases the dissolution rate) by the friction between the particles and the metal and enhancing the diffusion of reactants and products to and away from the surface by mixing and by reducing the thickness of the boundary layer.

While prior art CMP systems are capable of removing a copper overlayer from a silicon dioxide substrate, the systems do not satisfy the rigorous demands of the semiconductor industry. These requirements can be summarized as follows. First, there is a need for high removal rates of copper to satisfy throughput demands. Secondly, there must be excellent topography uniformity across the substrate. Finally, the CMP method must minimize local dishing and erosion effects to satisfy ever increasing lithographic demands.

BRIEF SUMMARY OF THE INVENTION

In one embodiment, the invention is a polishing composition comprising:

a) an abrasive; and b) an N-acyl-N-hydrocarbonoxyalkyl aspartic acid compound having the formula:

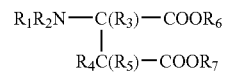

wherein $R_1$ is a hydrocarbonoxyalkyl group of from about 6 to about 30 carbon atoms, $R_2$ is a carboxyl substituted acyl group containing from about 2 to about 30 carbon atoms, or such a group at least partially neutralized with an alkali metal base, an alkaline earth metal base, an amine or a mixture of any of the foregoing, and $R_3$, $R_4$, $R_5$, $R_6$, and $R_7$ are each, independently, selected from hydrogen or a hydrocarbon group of from about 1 to about 30 carbon atoms.

In another embodiment, the invention is a method of polishing comprising the steps of:

A) placing a substrate in contact with a polishing pad;

B) delivering a polishing composition comprising:

a) an abrasive; and b) an N-acyl-N-hydrocarbonoxyalkyl aspartic acid compound having the formula:

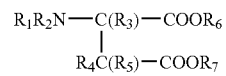

wherein $R_1$ is a hydrocarbonoxyalkyl group of from about 6 to about 30 carbon atoms, $R_2$ is a carboxyl substituted acyl group containing from about 2 to about 30 carbon atoms, or such a group at least partially neutralized with an alkali metal base, an alkaline earth metal base, an amine or a mixture of any of the foregoing, and $R_3$, $R_4$, $R_5$, $R_6$, and $R_7$ are each, independently, selected from hydrogen or a hydrocarbon group of from about 1 to about 30 carbon atoms; and C) polishing the substrate with the polishing composition.

In yet another embodiment, the invention is a polishing composition comprising:

a) an abrasive; and b) a tolyltriazole derivative having the formula:

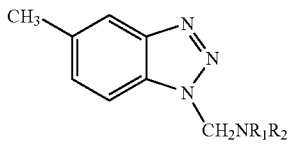

where $R_1$ and $R_2$ are independently hydrogen or a substituted or unsubstituted $C_1$–$C_8$ alkyl group. Suitable substituents include, but are not limited to hydroxy, chloro, bromo, iodo, fluoro, $C_1$–$C_4$-alkoxy, carboxyl, and amino. $R_1$ and $R_2$ can bear one or more substituents.

DETAILED DESCRIPTION OF THE INVENTION

It has been found that CMP slurry compositions comprising a) an abrasive and b) an N-acyl-N-hydrocarbonoxyalkyl aspartic acid compound possess high selectivity for removal of tantalum in relation to copper and are consequently particularly useful in step 2 copper CMP processing. Furthermore, selectivities for these CMP polishing compositions are tunable depending upon the level of the aspartic acid compound in a given composition.

Selective and Tunable CMP Slurry

The selective and tunable CMP slurry of this invention comprises a) an abrasive and b) an N-acyl-N-hydrocarbonoxyalkyl aspartic acid compound. For metal CMP applications, the CMP slurry of this invention further comprises c) an oxidizing agent. For some applications where especially high tantalum to copper selectivities are desired, the CMP slurry of this invention further comprises d) an aromatic triazole compound or derivative thereof. Optionally, other additives may be included.

When present in an inventive composition, a suitable aromatic triazole compound includes, but is not limited to, a tolyltriazole derivative having the formula:

c) a tolyltriazole derivative having the formula:

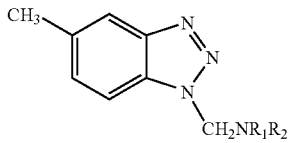

where $R_1$ and $R_2$ are independently hydrogen or a substituted or unsubstituted $C_1$–$C_8$ alkyl group. Suitable substituents include, but are not limited to hydroxy, chloro, bromo, iodo, fluoro, $C_1$–$C_4$-alkoxy, carboxyl, and amino. $R_1$ and $R_2$ can bear one or more substituents.

Both standard (unmodified) abrasives and organometallic-modified abrasives can be employed in this invention. Suitable unmodified abrasives include, but are not limited to, silica, alumina, titania, zirconia, germania, ceria, and co-formed products thereof, and mixtures thereof. An organometallic-modified abrasive obtained by treatment of an unmodified abrasive (e.g., silica) with an organometallic compound can also be employed in this invention. Suitable organometallic compounds for modification include aluminum acetate, aluminum formate, and aluminum propionate. Suitable abrasives include, but are not limited to, colloidal products, fumed products, and mixtures thereof.

Silica or organometallic-modified silica is a preferred abrasive material used in the present invention. The silica may be, for example, colloidal silica, fumed silica and other silica dispersions; however, the preferred silica is colloidal silica.

The abrasive is present in the slurry in a concentration of about 2 weight % to about 30 weight % of the total weight of the slurry. More preferably, the abrasive is present in a concentration of about 4 weight % to about 25 weight % of the total weight of the slurry. Most preferably, the abrasive is present in a concentration of about 5 weight % to about 20 weight % of the total weight of the slurry.

In embodiments of this invention having an oxidizing agent, the oxidizing agent can be any suitable oxidizing agent. Suitable oxidizing agents include, for example, one or more per-compounds, which comprise at least one peroxy group (—O—O—). Suitable per-compounds include, for example, peroxides, persulfates (e.g., monopersulfates and dipersulfates), percarbonates, and acids thereof, and salts thereof, and mixtures thereof. Other suitable oxidizing agents include, for example, oxidized halides (e.g., chlorates, bromates, iodates, perchlorates, perbromates, periodates, and acids thereof, and mixtures thereof, and the like), perboric acid, perborates, percarbonates, peroxyacids (e.g., peracetic acid, perbenzoic acid, m-chloroperbenzoic acid, salts thereof, mixtures thereof, and the like), permanganates, chromates, cerium compounds, ferricyanides (e.g., potassium ferricyanide), mixtures thereof, and the like. Preferred oxidizing agents include, for example, hydrogen peroxide, urea-hydrogen peroxide, sodium peroxide, benzyl peroxide, di-t-butyl peroxide, peracetic acid, monopersulfuric acid, dipersulfuric acid, iodic acid, and salts thereof, and mixtures thereof.

In compositions of this invention directed to metal CMP, (hydrogen peroxide) $H_2O_2$ is used as a preferred oxidizing agent. When used, preferably the concentration of the $H_2O_2$ is from about 0.2 weight % to about 5 weight % of the total weight of the slurry.

Other chemicals that may be added to the CMP slurry composition include, for example, surfactants, pH-adjusting agents, acids, corrosion inhibitors, fluorine-containing compounds, chelating agents, nitrogen-containing compounds, and salts.

Suitable surfactant compounds that may be added to the slurry composition include, for example, any of the numerous nonionic, anionic, cationic or amphoteric surfactants known to those skilled in the art. The surfactant compounds may be present in the slurry composition in a concentration of about 0 weight % to about 1 weight % and are preferably present in a concentration of about 0.001 weight % to about 0.1 weight % of the total weight of the slurry. The preferred types of surfactants are nonionic, anionic, or mixtures thereof and are most preferably present in a concentration of about 10 ppm to about 1000 ppm of the total weight of the slurry. Nonionic surfactants are most preferred. A preferred nonionic surfactant is Surfynol® 104E, which is a 50:50 mixture by weight of 2,4,7,9-tetramethyl-5-decyn-4,7-diol and ethylene glycol (solvent), (Air Products and Chemicals, Allentown, Pa.).

The pH-adjusting agent is used to improve the stability of the polishing composition, to improve the safety in handling and use, or to meet the requirements of various regulations. Suitable pH-adjusting agents to lower the pH of the polishing composition of the present invention include, but are not limited to, hydrochloric acid, nitric acid, sulfuric acid, chloroacetic acid, tartaric acid, succinic acid, citric acid, malic acid, malonic acid, various fatty acids, various polycarboxylic acids and mixtures thereof. Suitable pH-adjusting agents to raise the pH of the polishing composition of the present invention include, but are not limited to, potassium hydroxide, sodium hydroxide, ammonia, tetramethylammonium hydroxide, ethylenediamine, piperazine, polyethyleneimine, modified polyethyleneimines, and mixtures thereof. The polishing composition of the present invention is not particularly limited with respect to the pH, but it is usually adjusted to pH 3 to 10.

In metal CMP applications, compositions having basic or neutral pH values are generally preferred according to this invention. In this case, a suitable slurry pH is about 6.5 to about 10, preferably from about 8 to about 10, and more preferably, from about 8.5 to about 9.8.

Suitable acid compounds that may be added to the slurry composition include, but are not limited to, formic acid, acetic acid, propanoic acid, butanoic acid, pentanoic acid, hexanoic acid, heptanoic acid, octanoic acid, nonanoic acid, lactic acid, hydrochloric acid, nitric acid, phosphoric acid, sulfuric acid, hydrofluoric acid, malic acid, tartaric acid, gluconic acid, citric acid, phthalic acid, pyrocatechoic acid, pyrogallol carboxylic acid, gallic acid, tannic acid, and mixtures thereof. These acid compounds may be present in the slurry composition in a concentration of about 0 weight % to about 1 weight % of the total weight of the slurry.

To increase the removal rates of the slurry for tantalum and tantalum compounds as well as copper relative to silicon dioxide, fluorine-containing compounds may be added to the slurry composition. Suitable fluorine-containing compounds include, but are not limited to, hydrogen fluoride, perfluoric acid, alkali metal fluoride salt, alkaline earth metal fluoride salt, ammonium fluoride, tetramethylammonium fluoride, ammonium bifluoride, ethylenediammonium difluoride, diethylenetriammonium trifluoride, and mixtures thereof. The fluorine-containing compounds may be present in the slurry composition in a concentration of about 0 weight % to about 5 weight %, and are preferably present in a concentration of about 0.10 weight % to about 2 weight % of the total weight of the slurry. The preferred fluorine-containing compound is ammonium fluoride, most preferably present in a concentration of about 0 weight % to about 1 weight % of the total weight of the slurry.

Suitable chelating agents that may be added to the slurry composition include, but are not limited to, ethylenediaminetetracetic acid (EDTA), N-hydroxyethylethylenediaminetriacetic acid (NHEDTA), nitrilotriacetic acid (NTA), diethylenetriaminepentacetic acid (DPTA), ethanoldiglycinate, tricine, and mixtures thereof. The chelating agents may be present in the slurry composition in a concentration of about 0 weight % to about 3 weight %, and are preferably present in a concentration of about 0.05 weight % to about 0.20 weight % of the total weight of the slurry. Preferred chelating agents are tricine and EDTA and are most preferably present in a concentration of about 0.05 weight % to about 0.20 weight % of the total weight of the slurry.

Suitable nitrogen-containing compounds that may be added to the slurry composition include, but are not limited to, ammonium hydroxide, hydroxylamine, monoethanolamine, diethanolamine, triethanolamine, diethyleneglycolamine, N-hydroxylethylpiperazine, polyethyleneimine, modified polyethyleneimines, and mixtures thereof. The nitrogen-containing compounds may be present in the slurry composition in a concentration of about 0 weight % to about 1 weight %, and are preferably present in a concentration of about 0.01 weight % to about 0.20 weight % of the total weight of the slurry. The preferred nitrogen-containing compound is ammonium hydroxide and is most preferably present in a concentration of about 0.01 weight % to about 0.1 weight % of the total weight of the slurry.

Suitable salts that may be added to the slurry composition include, but are not limited to, ammonium persulfate, potassium persulfate, potassium sulfite, potassium carbonate, ammonium nitrate, potassium hydrogen phthalate, hydroxylamine sulfate, and mixtures thereof. The salts may be present in the slurry composition in a concentration of about 0 weight % to about 10 weight %, and are preferably present in a concentration of about 0 weight % to about 5 weight % of the total weight of the slurry. A preferred salt is ammonium nitrate and is most preferably present in a concentration of about 0 weight % to about 0.15 weight % of the total weight of the slurry.

Still other chemicals that can be added to the slurry compositions are biological agents such as bactericides, biocides and fungicides especially if the pH is around about 6 to 9. Suitable biocides, include, but are not limited to, 1,2-benzisothiazolin-3-one; 2(hydroxymethyl)amino ethanol; 1,3-dihydroxymethyl-5,5dimethylhydantoin; 1-hydroxymethyl-5,5-dimethylhydantion; 3-iodo-2-propynyl butylcarbamate; glutaraldehyde; 1,2-dibromo-2,4-dicyanobutane; 5-chloro-2-methyl-4-isothiazoline-3-one; 2-methyl-4-isothiazolin-3-one; and mixtures thereof.

Associated Method

The associated methods of this invention entail use of the aforementioned composition (as disclosed supra) for chemical mechanical planarization of substrates comprised of metals and dielectric materials. In the methods, a substrate (e.g., a wafer) is placed face-down on a polishing pad which is fixedly attached to a rotatable platen of a CMP polisher. In this manner, the substrate to be polished and planarized is placed in direct contact with the polishing pad. A wafer carrier system or polishing head is used to hold the substrate in place and to apply a downward pressure against the backside of the substrate during CMP processing while the platen and the substrate are rotated. The polishing composition (slurry) is applied (usually continuously) on the pad during CMP processing to effect the removal of material to planarize the substrate.

The slurry composition and associated methods of this invention are effective for CMP of a wide variety of substrates, including substrates having dielectric portions that comprise materials having dielectric constants less than 3.3 (low-k materials). Suitable low-k films in substrates include, but are not limited to, organic polymers, carbon-doped oxides, fluorinated silicon glass (FSG), inorganic porous oxide-like materials, and hybrid organic-inorganic materials. Representative low-k materials and deposition methods for these materials are summarized below.

| Vendor | Trade Name | Deposition Method | Material |
|---|---|---|---|
| Air Products and Chemicals | MesoElk ® | Spin-on | Hybrid organic-inorganic |
| Applied Materials | Black Diamond | CVD | Carbon-doped oxide |
| Dow Chemical | SiLK ™, Porous SiLK ™ | Spin-on | Organic polymer |
| Honeywell Electronic Materials | NANOGLASS ® E | Spin-on | Inorganic oxide-like |
| Novellus Systems | CORAL ® | PECVD | Carbon-doped oxide |

PECVD = Plasma enhanced chemical vapor deposition
CVD = chemical vapor deposition Similarly, the composition and associated methods of this invention are effective for CMP of substrates comprised of various metals, including, but not limited to, tantalum, titanium, tungsten and copper. The composition and associated methods of this invention afford very high selectivities for tantalum to copper in step 2 copper CMP applications.

While not being bound by any particular theory, the inventors believe that the following considerations may explain why a polishing composition comprising a) an abrasive, b) an N-acyl-N-hydrocarbonoxyalkyl aspartic acid compound and/or a tolyltriazole derivative, and c) an oxidizer (e.g., $H_2O_2$) affords a slurry having desirable characteristics of high tantalum to copper selectivity and which is also tunable with respect to copper to tantalum selectivities in step 2 copper CMP. An explanation of how these additives work in combination with step 1 copper CMP is described below.

Current copper CMP technology uses a two-step process to achieve local and global planarization in the production of IC chips. During copper CMP in step 1, the overburden copper is removed during IC fabrication processing. After removing the overburden copper in step 1, the polished surface still has not achieved local and global planarity due to differences in the step heights between high density and low density features on pattern wafers. After removing the overburden copper in step 1, a high tantalum to copper selectivity is desired to achieve local and global planarization. A challenging task is to maintain high tantalum removal while achieving high tantalum to copper selectivity and protection of the low lying copper regions. If the low lying copper regions are not protected during polishing, this results in a defect commonly known as "dishing". A slurry which can increase the tantalum to copper selectivity during polishing in step 2 can reduce "dishing" by providing wide overpolish window during chip fabrication processing.

In the present invention, certain corrosion inhibitors, such as CDX2128 (King Industries, Inc., Norwalk, Conn.) and/or CDX2165 (King Industries, Inc., Norwalk, Conn.), provide protection against copper corrosion and copper removal and provide for a low copper passive etch rate during CMP processing while maintaining high tantalum removal rates, thus affording high tantalum to copper selectivities. In addition to providing high tantalum to copper selectivity, this invention also teaches a method of how to "tune" tantalum to copper selectivity by varying the choice and/or concentration of corrosion inhibitors in the CMP slurry compositions. This latter feature provides for flexibility in the integration of step 2 with step 1 of copper CMP processing.

The present invention is further demonstrated by the examples below.

| GLOSSARY | |
|---|---|
| COMPONENTS | |
| CS | Syton ® OX-K (DuPont Air Products NanoMaterials L.L.C., Carlsbad, CA) colloidal silica |
| CDX2128 | Corrosion inhibitor —a N-acyl-N-hydrocarbonoxyalkyl aspartic acid compound, which is a water-soluble amino acid derivative (King Industries, Inc., Norwalk, CT)<br>The general structure of CDX2128 from a product bulletin for this product is as follows:<br>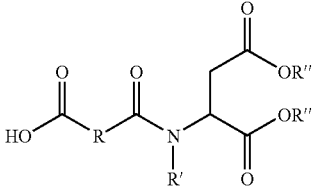<br>where R, R', and R" are not further specifically disclosed. This and related compounds are disclosed in U.S. Pat. No. 5,275,749, entitled "N-Acyl-N-hydrocarbonoxyalkyl Aspartic Acid Esters as Corrosion Inhibitors" to King Industries, Inc. |
| CDX2165 | Corrosion inhibitor - a tolyltriazole derivative (King Industries, Inc., Norwalk, CT)<br>The general structure of CDX2165 from a product bulletin for this product is as follows:<br>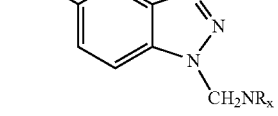<br>where $R_x$ is not further specifically disclosed. |
| PETEOS | Plasma enhanced deposition of tetraethoxy silane, dielectric oxide layer. |
| Politex ® Pad | Polishing pad used during CMP, supplied by Rodel, Inc, Phoenix, AZ. |

-continued

GLOSSARY

| | |
|---|---|
| S104E | Surfynol® 104E —a 50:50 mixture by weight of 2,4,7,9-tetramethyl-5-decyn-4,7-diol and ethylene glycol (solvent), Air Products and Chemicals, Allentown, PA. |
| TEOS | Tetraethyl orthosilicate |
| Tricine | N-[tris(hydroxymethyl)methyl]glycine, CAS # 5704-04-1 The structure of tricine is as follows: |

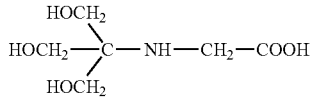

PARAMETERS
General

Å: angstrom(s) - a unit of length
BP: back pressure, in psi units
CMP: chemical mechanical planarization = chemical mechanical polishing
CS: carrier speed
DF: Down force: pressure applied during CMP, units psi
min: minute(s)
ml: milliliter(s)
mV: millivolt(s)
psi: pounds per square inch
PS: platen rotational speed of polishing tool, in rpm (revolution(s) per minute)
SF: slurry flow, ml/min
Removal Rates and Selectivities

| | |
|---|---|
| Cu RR 4.5 psi | Measured copper removal rate at 4.5 psi down pressure of the CMP tool |
| Cu RR 2 psi | Measured copper removal rate at 2 psi down pressure of the CMP tool |
| Ta RR 2 psi | Measured tantalum removal rate at 2 psi down pressure of the CMP tool |
| TEOS RR 2 psi | Measured TEOS removal rate at 2 psi down pressure of the CMP tool |
| PETEOS RR 2 psi | Measured PETEOS removal rate at 2 psi down pressure of the CMP tool |
| PETEOS:Cu Sel | PETEOS Cu Selectivity - The ratio of the amount of PETEOS (dielectric material) removed to the amount of copper removed during CMP experiments under identical conditions. |
| Ta:Cu Sel | Tantalum: Copper Selectivity - the ratio of the amount of tantalum removed to the amount of copper removed during CMP experiments under identical conditions. |
| TEOS:Cu Sel | TEOS: Cu Selectivity - The ratio of the amount of TEOS (dielectric material) removed to the amount of copper removed during CMP experiments under identical conditions. |

EXAMPLES

General

All percentages are weight percentages unless otherwise indicated.

CMP Methodology

In the examples presented below, CMP experiments were run using the procedures and experimental conditions given below.

Metrology

PETEOS thickness was measured with a Nanometrics, model, #9200, manufactured by Nanometrics Inc, 1550 Buckeye, Milpitas, Calif. 95035-7418. The metal films were measured with a ResMap CDE, model 168, manufactured by Creative Design Engineering, Inc, 20565 Alves Dr, Cupertino, Calif., 95014. The ResMap tool is a four-point probe sheet resistance tool. Twenty-five and forty nine-point polar scans were taken with the respective tools at 3-mm edge exclusion.

CMP Tool

The CMP tool that was used is a Mirra®, manufactured by Applied Materials, 3050 Boweres Avenue, Santa Clara, Calif., 95054. A Rodel Politex® embossed pad, supplied by Rodel, Inc, 3804 East Watkins Street, Phoenix, Ariz., 85034, was used on the platen for the blanket wafer polishing studies. Pads were broken-in by polishing twenty-five dummy oxide (deposited by plasma enhanced CVD from a TEOS precursor, PETEOS) wafers. In order to qualify the tool settings and the pad break-in, two PETEOS monitors were polished with Syton® OX-K colloidal silica, supplied by DuPont Air Products NanoMaterials L.L.C., at baseline conditions.

In blanket wafers studies, groupings were made to simulate successive film removal: first copper, next tantalum, and finally the PETEOS. The tool mid-point conditions were:

table speed; 123 rpm, head speed; 112 rpm, membrane pressure, 2.0 psi; inter-tube pressure, 0.0 psi; slurry flow, 200 ml/min.

Wafers

Polishing experiments were conducted using electrochemically deposited copper, tantalum, and PETEOS wafers. These blanket wafers were purchased from Silicon Valley Microelectronics, 1150 Campbell Ave, Calif., 95126. The film thickness specifications are summarized below:
PETEOS: 15,000 Å on silicon
Copper: 10,000 Å electroplated copper/1,000 Å copper seed/250 Å Ta on silicon
Tantalum: 2000 Å/5,000 Å thermal oxide on silicon Zeta Potential Measurements Zeta potential measurements were made using a Colloidal Dynamics instrument, manufactured by Colloidal Dynamics Corporation, 11-Knight Street, Building E8, Warwick, R.I., 02886. This instrument measures the zeta potential (surface charge) of colloidal particles, such as surface-modified colloidal silica particles.

Surface Coverage Measurements.

Surface coverage of aluminum acetate-modified colloidal silica was measured in the following manner. During the preparation of aluminum acetate-modified colloidal silica, aluminum acetate was added to the deionized colloidal silica particles. (The initial colloidal silica used to prepare deionized colloidal silica was Syton® HT-50 (DuPont Air Products NanoMaterials L.L.C., Carlsbad, Calif.), which has a negative zeta potential of −75 to −85 mV.) The addition of aluminum acetate changed the zeta potential of the deionized colloidal silica particle surface from a value near zero (−5 mV to +4 mV, depending upon pH) to +32–36 mV. After reaching the full surface coverage, there was observed to be subsequently no further change in the zeta potential of the surface modified colloidal silica. From the plotted titration curve of measured zeta potential as a function of amount of aluminum acetate added to a given amount of silica during surface modification, the percentage of surface coverage of aluminum acetate on the surface of the surface-modified colloidal silica particles was determined to be approximately 99.9%.

Examples 1–7

In these examples, CMP slurry compositions as shown in Table 1 were prepared and tested using the methodology, equipment, and processing as described supra. These CMP slurry compositions were comprised of potassium-stabilized colloidal silica (100 nm particles, supplied by Precision Colloids, L.L.C. (Cartersville, Ga.)), ammonium fluoride, Surfynol® 104E, hydrogen peroxide, CDX2128, and/or CDX2165 in an aqueous medium. The CMP slurry component amounts are shown in Table 1 for these examples. In each case, the balance of the composition was deionized water.

In these examples, the levels of the corrosion inhibitors (CDX2128 and CDX2165) were varied as indicated below (and in Table 1):

Example 1—Table 1, control, CDX2128%=0 wt. %
Example 2—Table 1, CDX2128%=0.1 wt. %
Example 3—Table 1, CDX2128%=0.2 wt. %
Example 4—Table 1, CDX2128%=0.3 wt. %
Example 5—Table 1, CDX2128%=0.4 wt. %
Example 6—Table 1, CDX2128%=0.1 wt. %, CDX2165%=0.1 wt. %.
Example 7—Table 1, CDX2128%=0.2 wt. %, CDX2165%=0.2 wt. %.

The down force (membrane pressure) in these examples was 2 psi.

Each of these slurry compositions was subjected to CMP processing and afforded the results reported in Table 1. It is noted especially that, from the data collected for Examples 1–7, clearly, as the concentration of the corrosion inhibitor(s) increases, tantalum to copper selectivity increases from 0.85 to 13. The examples also suggest that the tantalum to copper selectivity can be tuned to any value with a wide window of operation for a step 2 copper CMP slurry

TABLE 1

Effect of corrosion inhibitor level(s) on tantalum to copper selectivity*

| Sample | Ex. 1 | Ex. 2 | Ex. 3 | Ex. 4 | Ex. 5 | Ex. 6 | Ex. 7 |
| --- | --- | --- | --- | --- | --- | --- | --- |
| Silica particles (wt. %)*** | 7 | 7 | 7 | 7 | 7 | 7 | 7 |
| $NH_4F$ (wt. %) | 0.22 | 0.22 | 0.22 | 0.22 | 0.22 | 0.22 | 0.22 |
| S104E (wt. %) | 0.07 | 0.07 | 0.07 | 0.07 | 0.07 | 0.07 | 0.07 |
| CDX 2128 (wt. %) | | 0.1 | 0.2 | 0.3 | 0.4 | 0.1 | 0.2 |
| CDX 2165 (wt. %) | | | | | | 0.1 | 0.2 |
| $H_2O_2$ (wt. %) | 1.3 | 1.3 | 1.3 | 1.3 | 1.3 | 1.3 | 1.3 |
| $H_2O$ (wt. %) | 91.41 | 91.31 | 91.21 | 91.11 | 91.01 | 91.21 | 91.01 |
| pH | 8 | 8 | 8 | 8 | 8 | 8 | 8 |
| Cu RR 2 psi (Å/min) | 753 | 177 | 160 | 159 | 162 | 52 | 48 |
| Ta RR 2 psi (Å/min) | 637 | 588 | 598 | 600 | 592 | 571 | 624 |
| Ta:Cu Sel (at 2 psi) | 0.85 | 3.3 | 3.7 | 3.8 | 3.7 | 11.0 | 13.0 |

*A blank entry for a component weight percentage (wt. %) indicates that a level of 0 weight percent for that component.
***Potassium-stabilized colloidal silica - 100 nm particles.

Examples 8–11

The CMP slurry compositions for Examples 8–11 were comprised of potassium-stabilized colloidal silica (45 nm particles of Syton® OX-K (DuPont Air Products NanoMaterials L.L.C., Carlsbad, Calif.)), hydrogen peroxide, CDX2128, and/or CDX2165 in an aqueous medium. The CMP slurry component amounts are shown in Table 2 for these examples. In each case, the balance of the composition was deionized water. These examples were prepared and tested using the methodology, equipment, and processing as described supra.

In these examples, the levels of the corrosion inhibitor (CDX2128) were varied as indicated below (and in Table 2).

Example 8—Table 2, CDX2128%=0 wt. %
Example 9—Table 2, CDX2128%=0.4 wt. %
Example 10—Table 2, CDX2128%=0.6 wt. %
Example 11—Table 2, CDX2128%=1.0 wt. %

The down force (membrane pressure) in these examples was 2 psi.

TABLE 2

Effect of corrosion inhibitor (CDX2128) on tantalum to copper selectivity

| Sample | Ex. 8 | Ex. 9 | Ex. 10 | Ex. 11 |
|---|---|---|---|---|
| Silica particles (wt. %)## | 12 | 12 | 12 | 12 |
| CDX2128 (wt. %) | 0 | 0.4 | 0.6 | 1.0 |
| $H_2O_2$ (wt. %) | 0.6 | 0.6 | 0.6 | 0.6 |
| S104E (wt. %) | 0.07 | 0.07 | 0.07 | 0.07 |
| $NH_4F$ (wt. %) | 0.22 | 0.22 | 0.22 | 0.22 |
| $H_2O$ (wt. %) | 87.1 | 86.7 | 86.5 | 86.1 |
| pH | 8 | 8 | 8 | 8 |
| Cu RR 2 psi (Å/min) | 532 | 65 | 61 | 63 |
| Ta RR 2 psi (Å/min) | 840 | 759 | 749 | 692 |
| Ta:Cu Sel (at 2 psi) | 1.5 | 11.6 | 12.2 | 10.9 |

Potassium stabilized colloidal silica - 45 nm particles

Each of these polishing compositions was subjected to CMP processing and afforded the results reported in Table 2. Clearly, as the data from Table 2 indicates, as the concentration of CDX2128 was increased from 0.4% to 1%, tantalum to copper selectivity was found to increase from 1.5 to 10.9 and exhibited an even higher value of 12.2 at a 0.6% level of CDX2128.

Examples 12–15

These examples were run in the same manner as for previous examples except that the polishing compositions used were somewhat different. The CMP slurry compositions for Examples 12–15 examples were comprised of potassium-stabilized colloidal silica (45 nm particles of Syton@ OX-K (DuPont Air Products NanoMaterials L.L.C., Carlsbad, Calif.) ), Surfynol® 104E, hydrogen peroxide, CDX2128, and/or CDX2165 in an aqueous medium. The CMP slurry component amounts are shown in Table 3 for these examples. The levels of CDX2128 and CDX2165 as well as the pH were varied in these examples as indicated in Table 3. In each case, the balance of the composition was deionized water. The down force (membrane pressure) in these examples was 2 psi.

Each of these polishing compositions was subjected to CMP processing and afforded the results reported in Table 3. Clearly, from the results shown in Table 3 (in comparison to results in Tables 1 and 2), high levels of potassium stabilized colloidal silica solids and high pH can reduce tantalum to copper selectivity to relatively low values.

TABLE 3

Effect with/without CDX2128, CDX2165 on Ta:Cu Selectivity

| | Example | | | |
|---|---|---|---|---|
| | Ex. 12 | Ex. 13 | Ex. 14 | Ex. 15 |
| Silica particles (wt. %)## | 15 | 15 | 15 | 15 |
| S104E (wt. %) | 0.07 | 0.07 | 0.07 | 0.07 |
| CDX 2128 (wt. %) | 0.2 | | 0.2 | 0 |
| CDX 2165 (wt. %) | 0.2 | 0.2 | | 0 |
| $H_2O_2$ (wt. %) | 1.3 | 1.3 | 1.3 | 1.3 |
| $H_2O$ (wt. %) | 83.23 | 83.43 | 83.43 | 83.63 |
| pH | 9.6 | 9.7 | 9.7 | 9.7 |
| Cu RR 2 psi (Å/min) | 114 | 125 | 426 | 790 |
| Ta RR 2 psi (Å/min) | 612 | 587 | 545 | 640 |
| PETEOS RR (Å/min) | 796 | 640 | 732 | 944 |
| Ta:Cu Sel (at 2 psi) | 5.4 | 4.7 | 1.3 | 0.8 |
| Ta:PETEOS Sel (at 2 psi) | 0.8 | 0.9 | 0.7 | 0.7 |

Potassium-stabilized colloidal silica - 45 nm particles.

Examples 16–22

In Table 4, compositions of various components used in Examples 16 through 22, are summarized; these various compositions contain different types of surface modified colloidal silica.

Example 16: potassium-stabilized colloidal silica with no CDX2128. The potassium-stabilized silica was Syton@ OX-K (DuPont Air Products NanoMaterials L.L.C.).

Example 17: potassium-stabilized colloidal silica with 0.1% CDX2128. The potassium-stabilized silica was Syton@ OX-K (DuPont Air Products NanoMaterials L.L.C.).

Example 18 and 19: boric acid -modified colloidal silica with 0.1% CDX2128. The boric acid modified silica was prepared using the following procedure:

Preparation of boric acid modified silica: Approximately 1 kg of Amberlite® IR-120 ion exchange resin (Rohm and Haas Company, Philadelphia, Pa.) was washed with 1 liter of 20% sulfuric acid solution. The mixture was stirred and the resin was allowed to settle. The aqueous layer was decanted and washed with 10 liters of deionized water. The mixture was again allowed to settle and then the aqueous layer was decanted. This procedure was repeated until the decanted water was colorless. This procedure afforded acid-state resin.

Syton® HT50 (12 kg, approximately 2.27 gallons, DuPont Air Products NanoMaterials L.L.C., Carlsbad, Calif.) was placed in a 5 gallon mix tank equipped with an agitator. 2.502 kg of deionized water was added to the tank and the solution was allowed to mix a few minutes. The pH of the solution was measured to be approximately 10.2. With continued pH monitoring, small amounts of acid-state resin were added, while allowing the pH to stabilize in between additions. Additional resin was added in small portions until the pH had dropped to pH 1.90–2.20. Once this pH limit had been reached and was stable in this range, no further resin additions were made and the mixture was stirred for 1–1.5 hours. Subsequently the mixture was passed through a 500-mesh screen to remove the resin and afforded deionized Syton® HT-50.

A solution of 268 g of boric acid powder (Fisher Scientific, 2000 Park Lane, Pittsburgh, Pa, 15275) in 5.55 kg of deionized water was prepared in a 10 gallon mixing tank equipped with an agitator and a heater by slowly adding the boric acid powder until all had been added to the water and then agitating the mixture for 15 hours and increasing the temperature of the mixture to 55–65° C. Deionized, and diluted Syton® HT-50 (14.5 kg) was then added to the boric acid solution slowly over about 1.2 hours by adding it at approximately 200 ml/minute and maintaining the temperature greater than 52® C. while agitating the mixture. After this addition was completed, heating at 60° C. and agitation of the mixture was continued for 5.5 hours. The resulting solution was subsequently filtered through a 1-micron filter to afford boron surface-modified colloidal silica.

This boron surface-modified colloidal silica was characterized for colloid stability over 15 days using a Colloidal Dynamics instrument (11-Knight Street, Building E8, Warwick, R.I., 02886). This boron surface-modified colloidal silica was found to exhibit both constant pH (approximately 6.6) and zeta potential (approximately −58 millivolts) over the 15-day test period. The percentage of surface sites of this surface-modified colloidal silica occupied by boron-containing compound(s) was approximately 98%.

Example 20 and 21: Alumina-modified colloidal silica with 0.1% CDX2128. The alumina-modified silica was obtained from DuPont Air Products NanoMaterials, L.L.C, (Carlsbad, Calif.), where the alumina-modified grade is available as DP106.

Example 22: Aluminum acetate-modified colloidal silica with 0.1% CDX2128. The aluminum acetate modified silica was prepared using the following procedure:

Aluminum acetate surface-modified colloidal silica was prepared using the following procedure. Deionized water (10,507 grams) and basic aluminum acetate (boric acid stabilized, 1,284 grams, 35.3 weight % alumina equivalent) (Aldrich Chemicals, Milwaukee, Wis.) were combined in a dry mixing vessel (holding approx. 12–15 gallons) that was equipped with high shear agitation means. The mixture was agitated until all solids were completely dissolved affording reaction mixture A.

In a separate clean, dry vessel, deionized water (10,663 grams) and Syton® HT50 (22,687 grams, approximately 4.31 gallons, DuPont Air Products NanoMaterials L.L.C., Carlsbad, Calif.) were combined with moderate agitation and mixed thoroughly. With moderate agitation at ambient temperature and with continual pH monitoring, spoonfuls of IRC-120 ion exchange resin (approximately 3,907 grams, (Aldrich Chemicals, Milwaukee, Wis.)) were added to this resulting mixture. After each resin batch addition, the reaction mass pH was allowed to stabilize for several minutes. Additional resin batch additions were made until a pH level of 2.00+−0.05 was reached. Soon after attaining the target pH of 2, the reaction mixture was filtered to remove the resin beads and affording reaction mixture B.

With high shear agitation and at ambient temperature, reaction mixture B was added to reaction mixture A at a constant rate over a 1 hour period. Once addition was completed, the high shear agitation was continued for 30 minutes affording the aluminum acetate surface-modified colloidal silica.

The pH of aluminum acetate surface-modified colloidal silica was measured to be 4.6 and zeta potential was measured to be +30 to +40 millivolts. From the measured zeta potential, the surface coverage was estimated to be 99.9% using the Colloidal Dynamics instrument.

Each of these polishing compositions was subjected to CMP processing and afforded the results reported in Table 4. Clearly, surface modified colloidal silica affects tantalum to copper selectivities under identical conditions. Interestingly, potassium stabilized colloidal silica gave the highest tantalum to copper selectivity, followed by alumina modified colloidal silica, whereas boric acid stabilized, and aluminum acetate modified colloidal silica gave comparatively low tantalum to copper selectivity. Thus, tantalum to copper tunability can be further enhanced using various surface-modified silicas in combination with corrosion inhibitor.

TABLE 4

Effect of Surface Modified silica, on tantalum to copper selectivity, Concentration of CDX2128 at 0.10%

| Sample | Ex. 16, Syton® OX-K, control# | Ex. 17, Syton® OX-K# | Ex. 18, boron modified silica## | Ex. 19, boron modified silica## | Ex. 20, alumina modified silica** | EX. 21, alumina modified silica** | Ex. 22, aluminum acetate modified silica### |
|---|---|---|---|---|---|---|---|
| Silica particles (wt. %) | 10 | 10 | 10 | 20 | 10 | 20 | 10 |
| NH$_4$F (wt. %) | 0.22 | 0.22 | 0.22 | 0.22 | 0.22 | 0.22 | 0.22 |
| S104E (wt. %) | 0.07 | 0.07 | 0.07 | 0.07 | 0.07 | 0.07 | 0.07 |
| CDX 2128 (wt. %) | 0 | 0.1 | 0.1 | 0.1 | 0.1 | 0.1 | 0.1 |
| CDX 2165 (wt. %) | 0 | 0 | 0 | 0 | 0 | 0 | 0 |
| H$_2$O$_2$ (wt. %) | 1.3 | 1.3 | 1.3 | 1.3 | 1.3 | 1.3 | 1.3 |
| H$_2$O (wt. %) | 88.41 | 88.31 | 88.31 | 78.31 | 88.31 | 78.31 | 88.31 |
| pH | 8 | 8 | 8 | 8 | 8 | 8 | 8 |
| Cu RR 2 psi (Å/min) | 783 | 73 | 110 | 361 | 61 | 91 | 82 |
| Ta RR 2 psi (Å/min) | 584 | 595 | 451 | 858 | 433 | 839 | 580 |
| Ta:Cu Sel (at 2 psi) | 0.7 | 8.2 | 4.1 | 2.4 | 7.1 | 9.2 | 7.0 |

Potassium-stabilized colloidal silica - 45 nm particles.
Boric acid-modified colloidal silica
**Alumina-modified colloidal silica, DP106
Aluminum acetate-modified colloidal silica.

Prophetic Example 23

This prophetic example 23 will contain the following components:
1) Potassium-stabilized colloidal silica=10 wt. % solids
2) Ammonium fluoride=0.22 wt. %
3) S104E=0.07 wt. %
4) H$_2$O$_2$=1.3 wt. %
5) As a modified CDX2128, N-3-carboxy-1-oxo-propyl-N-3-cyclohexyloxypropyl aspartic acid diisobutyl diester=0.1%

Predicted polishing results expected under identical polishing conditions as described in Example 17:
Copper removal rates will be approximately 73 Å/min, tantalum removal rates will be approximately 595 Å/min.
Tantalum to copper selectivity approximately 8.2
Similar prophetic examples will include other compounds as modified CDX2128 components in polishing compositions; these will include the following compounds substituted in place of the N-3-carboxy-1-oxo-propyl-N-3-cyclohexyloxypropyl aspartic acid diisobutyl diester component of Prophetic Example 23. All other components will be the same as in Prophetic Example 23. The polishing results for Prophetic Examples 24–31 are predicted to be approximately the same as for Prophetic Example 23.

Prophetic Example 24—N-3-carboxy-1-oxo-propyl-N-3-isodecyloxypropyl aspartic acid diisobutyl diester.

Prophetic Example 25—N-3-carboxy-1-oxo-propyl-N-3-octyloxypropyl aspartic acid diisobutyl diester Prophetic Example 26—N-3-carboxy-1-oxo-propyl-N-3-decyloxypropyl aspartic acid diisobutyl diester Prophetic Example 27—N-3-carboxy-1-oxo-propyl-3-tetradecyloxypropyl aspartic acid diisobutyl diester Prophetic Example 28—N-3-carboxy-1-oxo-propyl-N-3-hexadecyloxypropyl aspartic acid diisobutyl diester Prophetic Example 29—N-3-carboxy-1-oxo-propyl-N-3-pentadecyloxypropyl aspartic acid diisobutyl diester Prophetic Example 30—N-3-carboxy-1-oxo-propyl-N-3-tridecyloxypropyl aspartic acid diisobutyl diester Prophetic Example 31—N-3-carboxy-1-oxo-propyl-N-3-dodecyloxypropyl aspartic acid diisobutyl diester.

Examples 32–34

These examples were run using the same procedure as for previous examples except that the polishing compositions were somewhat different. The CMP slurry compositions for Examples 32–34 were comprised of potassium-stabilized colloidal silica (45 nm particles of Syton® OX-K (DuPont Air Products NanoMaterials L.L.C., Carlsbad, Calif.) ), Surfynol 104E, hydrogen peroxide, and CDX2165 in an aqueous medium. In Table 5, Example 32 is a control experiment with no CDX2165, the Example 33 composition contained 0.1% CDX2165, and the Example 34 composition contained 0.2% CDX2165. The other component levels of the CMP slurry were as shown in Table 5. In each case, the balance of the composition was deionized water. The down force (membrane pressure) employed in these examples was 2 psi.

Each of these polishing compositions was subjected to CMP processing and afforded the results reported in Table 5. Clearly, as indicated in Table 5, as the concentration of CDX2165 was increased, the copper removal rate was observed to decrease from 467 Å/minute to 198 Å/minute, and the tantalum to copper selectivity was observed to increase from 1.07 to 3.0.

TABLE 5

Effect of CDX2165 on Ta:Cu Selectivity

| | Example | | |
|---|---|---|---|
| | Ex. 32 | Ex. 33 | Ex. 34 |
| Silica particles (wt. %)## | 15 | 15 | 15 |
| S104E (wt. %) | 0.07 | 0.07 | 0.07 |
| CDX 2128 (wt. %) | 0.0 | 0.0 | 0.0 |

TABLE 5-continued

Effect of CDX2165 on Ta:Cu Selectivity

| | Example | | |
|---|---|---|---|
| | Ex. 32 | Ex. 33 | Ex. 34 |
| CDX 2165 (wt. %) | 0.0 | 0.1 | 0.2 |
| $H_2O_2$ (wt. %) | 1.3 | 1.3 | 1.3 |
| $H_2O$ (wt. %) | 83.63 | 83.53 | 83.43 |
| pH | 9.6 | 9.7 | 9.7 |
| Cu RR 2 psi (Å/min) | 467 | 442 | 198 |
| Ta RR 2 psi (Å/min) | 502 | 503 | 594 |
| PETEOS RR 2 psi (Å/min) | 808 | 857 | 918 |
| Ta:Cu Sel (at 2 psi) | 1.07 | 1.13 | 3.0 |
| Ta:PETEOS Sel (at 2 psi) | 0.62 | 0.58 | 0.64 |

While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A polishing composition comprising:
a) an abrasive;
b) an N-acyl-N-hydrocarbonoxyalkyl aspartic acid compound having the formula

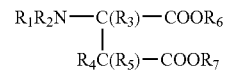

wherein $R_1$ is a hydrocarbonoxyalkyl group of from about 6 to about 30 carbon atoms, $R_2$ is a carboxyl substituted acyl group containing from about 2 to about 30 carbon atoms, or such a group at least partially neutralized with an alkali metal base, an alkaline earth metal base, an amine or a mixture of any of the foregoing, and $R_3$, $R_4$, $R_5$, $R_6$, and $R_7$ are each, independently, selected from hydrogen or a hydrocarbon group of from about 1 to about 30 carbon atoms;
c) an oxidizing agent;
d) an aromatic triazole compound or derivative thereof; and
e) tricine.

2. The composition of claim 1 wherein the abrasive is an organometallic-modified abrasive.

3. A method of polishing comprising the steps of:
A) placing a substrate in contact with a polishing pad;
B) delivering a polishing composition comprising
a) an abrasive; and
b) an N-acyl-N-hydrocarbonoxyalkyl aspartic acid compound having the formula:

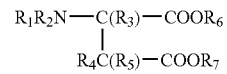

wherein $R_1$ is a hydrocarbonoxyalkyl group of from about 6 to about 30 carbon atoms, $R_2$ is a carboxyl substituted acyl group containing from about 2 to about 30 carbon atoms, or such a group at least partially neutralized with an alkali metal base, an alkaline earth metal base, an amine or a mixture of any of the foregoing, and $R_3$, $R_4$, $R_5$, $R_6$, and $R_7$ are each, independently, selected from hydrogen or a hydrocarbon group of from about 1 to about 30 carbon atoms;

c) an oxidizing agent;

d) an aromatic triazole compound or derivative thereof; and e) tricine; and

C) polishing the substrate with the polishing composition.

4. The method of claim 3 wherein the abrasive in the composition is an organometallic-modified abrasive.

5. A polishing composition comprising:

a) an abrasive;

b) a tolyltriazole derivative having the formula:

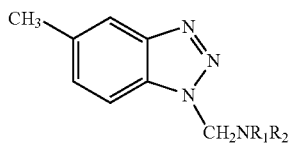

where $R_1$ and $R_2$ are independently hydrogen or a substituted or unsubstituted $C_1$–$C_8$ alkyl group;

c) an oxidizing agent; and d) tricine.

6. The composition of claim 5 wherein the abrasive is an organometallic-modified abrasive.

7. A polishing composition comprising:

a) an abrasive;

b) an N-acyl-N-hydrocarbonoxyalkyl aspartic acid compound having the formula

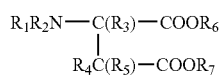

wherein $R_1$ is a hydrocarbonoxyalkyl group of from about 6 to about 30 carbon atoms, $R_2$ is a carboxyl substituted acyl group containing from about 2 to about 30 carbon atoms, or such a group at least partially neutralized with an alkali metal base, an alkaline earth metal base, an amine or a mixture of any of the foregoing, and $R_3$, $R_4$, $R_5$, $R_6$, and $R_7$ are each, independently, selected from hydrogen or a hydrocarbon group of from about 1 to about 30 carbon atoms;

c) a biological agent selected from the group consisting of bactericides, biocides, fungicides and mixtures thereof; and d) tricine.

8. The composition of claim 7 wherein the abrasive is an organometallic-modified abrasive.

9. A method of polishing comprising the steps of:

A) placing a substrate in contact with a polishing pad;

B) delivering a polishing composition comprising;

a) an abrasive;

b) an N-acyl-N-hydrocarbonoxyalkyl aspartic acid compound having the formula:

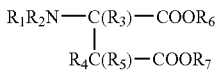

wherein $R_1$ is a hydrocarbonoxyalkyl group of from about 6 to about 30 carbon atoms, $R_2$ is a carboxyl substituted acyl group containing from about 2 to about 30 carbon atoms, or such a group at least partially neutralized with an alkali metal base, an alkaline earth metal base, an amine or a mixture of any of the foregoing, and $R_3$, $R_4$, $R_5$, $R_6$, and $R_7$ are each, independently, selected from hydrogen or a hydrocarbon group of from about 1 to about 30 carbon atoms; and c) a biological agent selected from the group consisting of bactericides, biocides, fungicides and mixtures; and d) tricine; and C) polishing the substrate with the polishing composition.

10. The method of claim 9 wherein the abrasive in the composition is an organometallic-modified abrasive.

11. A polishing composition comprising:

a) an abrasive;

b) a tolyltriazole derivative having the formula:

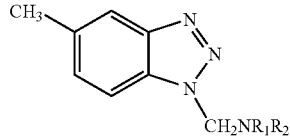

where $R_1$ and $R_2$ are independently hydrogen or a substituted or unsubstituted $C_1$–$C_8$ alkyl group;

c) a biological agent selected from the group consisting of bactericides, biocides, fungicides and mixtures thereof; and d) tricine.

12. The composition of claim 11 wherein the abrasive is an organometallic-modified abrasive.

13. A polishing composition comprising:

a) an organometallic-modified abrasive;

b) an N-acyl-N-hydrocarbonoxyalkyl aspartic acid compound having the formula

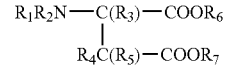

wherein $R_1$ is a hydrocarbonoxyalkyl group of from about 6 to about 30 carbon atoms, $R_2$ is a carboxyl substituted acyl group containing from about 2 to about 30 carbon atoms, or such a group at least partially neutralized with an alkali metal base, an alkaline earth metal base, an amine or a mixture of any of the foregoing, and $R_3$, $R_4$, $R_5$, $R_6$, and $R_7$ are each, independently, selected from hydrogen or a hydrocarbon group of from about 1 to about 30 carbon atoms; and c) tricine.

14. A polishing composition comprising:

a) an organometallic-modified abrasive;

b) a tolyltriazole derivative having the formula:

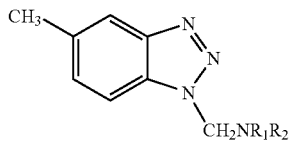

where $R_1$ and $R_2$ are independently hydrogen or a substituted or unsubstituted $C_1$–$C_8$ alkyl group; and c) tricine.

15. A method of polishing comprising the steps of:
A) placing a substrate in contact with a polishing pad;
B) delivering a polishing composition comprising
   a) an organometallic-modified abrasive;
   b) an N-acyl-N-hydrocarbonoxyalkyl aspartic acid compound having the formula:

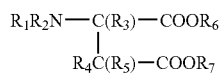

wherein $R_1$ is a hydrocarbonoxyalkyl group of from about 6 to about 30 carbon atoms, $R_2$ is a carboxyl substituted acyl group containing from about 2 to about 30 carbon atoms, or such a group at least partially neutralized with an alkali metal base, an alkaline earth metal base, an amine or a mixture of any of the foregoing, and $R_3$, $R_4$, $R_5$, $R_6$, and $R_7$ are each, independently, selected from hydrogen or a hydrocarbon group of from about 1 to about 30 carbon atoms; and
   c) tricine; and
C) polishing the substrate with the polishing composition.

16. A method of polishing comprising the steps of:
A) placing a substrate in contact with a polishing pad;
B) delivering a polishing composition comprising
   a) an organometallic-modified abrasive;
   b) a tolyltriazole derivative having the formula:

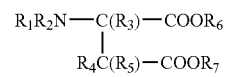

where $R_1$ and $R_2$ are independently hydrogen or a substituted or unsubstituted $C_1$–$C_8$ alkyl group; and
   c) tricine; and
C) polishing the substrate with the polishing composition.

* * * * *

UNITED STATES PATENT AND TRADEMARK OFFICE
CERTIFICATE OF CORRECTION

PATENT NO.       : 7,153,335 B2
APPLICATION NO.  : 10/683232
DATED            : December 26, 2006
INVENTOR(S)      : Junaid Ahmed Siddiqui It is certified that error appears in the above-identified patent and that said Letters Patent is hereby corrected as shown below:

Column 24, line 17 replace formula 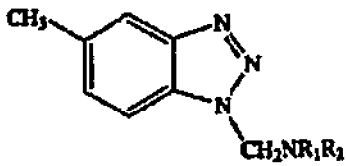

with formula 

Signed and Sealed this

Seventeenth Day of April, 2007

JON W. DUDAS
*Director of the United States Patent and Trademark Office*